United States Patent
Kim et al.

(10) Patent No.: US 10,863,483 B2
(45) Date of Patent: *Dec. 8, 2020

(54) METHOD AND APPARATUS FOR CONTROLLING A ELECTRONIC DEVICE IN A COMMUNICATION SYSTEM

(71) Applicant: Samsung Electronics Co., Ltd., Suwon-si (KR)

(72) Inventors: Soenghun Kim, Suwon-si (KR); Hanil Yu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,007

(22) Filed: Sep. 30, 2019

(65) Prior Publication Data
US 2020/0037299 A1    Jan. 30, 2020

Related U.S. Application Data

(63) Continuation of application No. 15/065,731, filed on Mar. 9, 2016, now Pat. No. 10,433,285.

(30) Foreign Application Priority Data

Mar. 9, 2015    (KR) ......................... 10-2015-0032705

(51) Int. Cl.
*H04W 72/04*    (2009.01)
*H04W 76/14*    (2018.01)
(Continued)

(52) U.S. Cl.
CPC ........ *H04W 72/0406* (2013.01); *G08C 17/02* (2013.01); *H04W 4/08* (2013.01);
(Continued)

(58) Field of Classification Search
CPC .. H04W 4/08; H04L 12/2807; H04L 12/2814; H04N 21/4131
See application file for complete search history.

(56) References Cited

U.S. PATENT DOCUMENTS 9,747,432 B1 *    8/2017    Koller .................... G06F 21/36
2006/0217104 A1    9/2006    Cho
(Continued)

FOREIGN PATENT DOCUMENTS

CN    101641938 A    2/2010
CN    103959737 A    7/2014
(Continued)

OTHER PUBLICATIONS

International Search Report dated Jun. 29, 2016 in connection with International Application No. PCT/KR2016/002351, 4 pages.
(Continued)

*Primary Examiner* — Robert C Scheibel

(57) ABSTRACT

A method and apparatus is provided that controls other electronic devices through one electronic device in a communication system. The electronic device for executing control commands includes a communication unit configured to communicate with at least one of other electronic devices, a memory configured to store identification information about other electronic devices to execute a group control command, and a controller configured to execute, when receiving the control command, the received control command, determine whether the received control command is a group control command that other electronic devices need to execute in the same way as the electronic device, read, when the received control command is a group control command, identification information about at least one of
(Continued)

other electronic devices as group control objects from the memory, and transmit the identification information to other electronic devices.

8 Claims, 9 Drawing Sheets

(51) Int. Cl.
    *H04W 4/80*     (2018.01)
    *G08C 17/02*     (2006.01)
    *H04W 4/08*     (2009.01)

(52) U.S. Cl.
    CPC .............. *H04W 4/80* (2018.02); *H04W 76/14* (2018.02); *G08C 2201/93* (2013.01)

(56) References Cited

U.S. PATENT DOCUMENTS

| | | | | |
|---|---|---|---|---|
| 2008/0056514 | A1* | 3/2008 | Ito | H04B 1/202 381/119 |
| 2010/0131633 | A1 | 5/2010 | Herlein et al. | |
| 2011/0185048 | A1* | 7/2011 | Yew | H04M 1/72527 709/221 |
| 2012/0190394 | A1 | 7/2012 | Kwon et al. | |
| 2013/0036181 | A1* | 2/2013 | Choi | H04L 67/16 709/206 |
| 2013/0082827 | A1* | 4/2013 | Cho | H04L 12/282 340/12.52 |
| 2014/0073881 | A1 | 3/2014 | Sadhu | |
| 2016/0043962 | A1* | 2/2016 | Kim | H04L 67/02 709/224 |

FOREIGN PATENT DOCUMENTS

| | | |
|---|---|---|
| KR | 10-2006-0102724 A | 9/2006 |
| KR | 10-0823086 B1 | 4/2008 |
| KR | 10-2010-0044382 A | 4/2010 |
| KR | 10-2014-0042243 A | 4/2014 |
| WO | 2011/059156 A1 | 5/2011 |

OTHER PUBLICATIONS

Extended European Search Report dated Jul. 19, 2016 in connection with European Application No. 16159388.4, 6 pages.

Office Action dated Dec. 25, 2019 in connection with Chinese Patent Application No. 201510221907.5, 15 pages.

\* cited by examiner

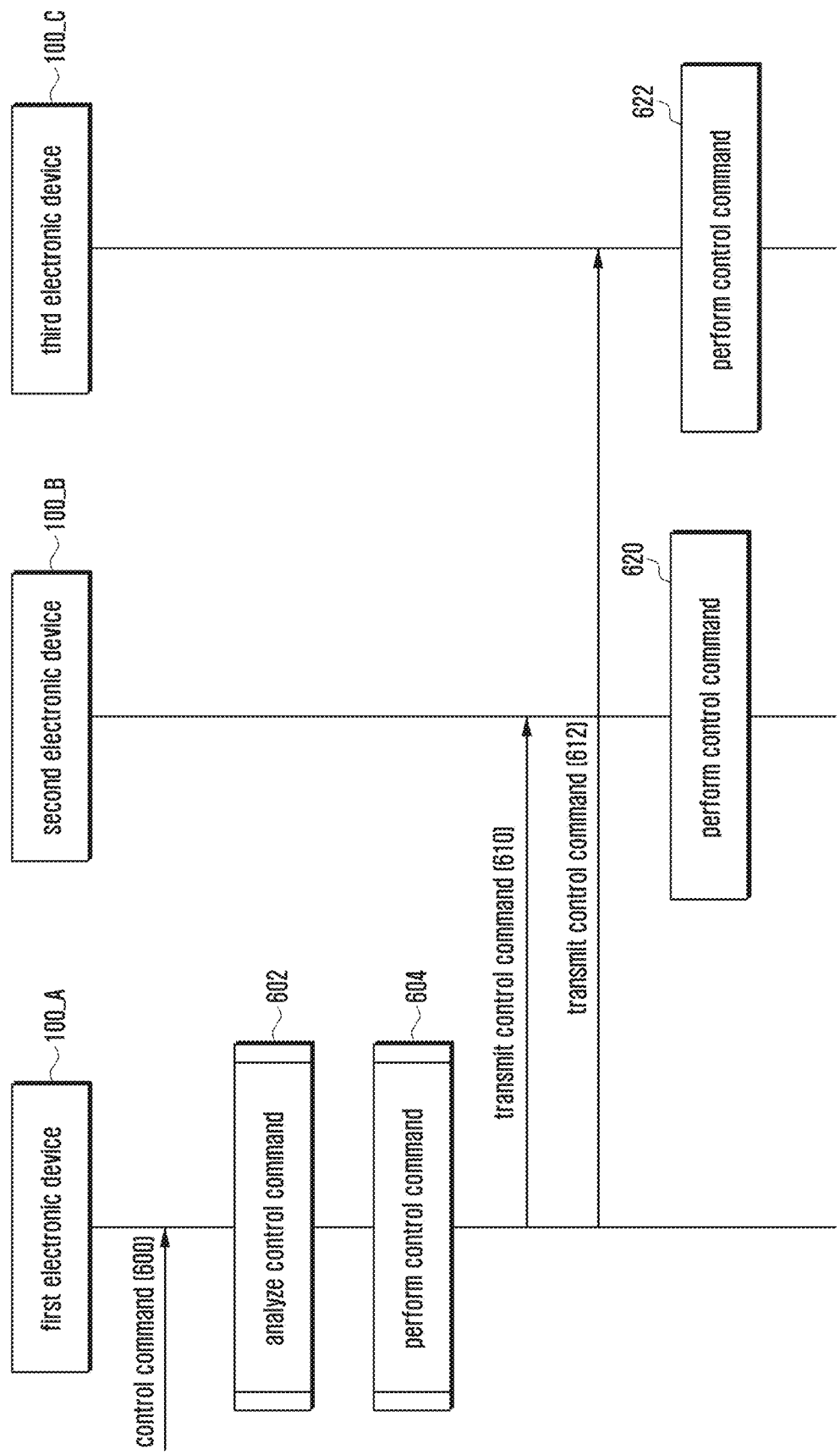

METHOD AND APPARATUS FOR CONTROLLING A ELECTRONIC DEVICE IN A COMMUNICATION SYSTEM

CROSS-REFERENCE TO RELATED APPLICATIONS

The present application is a continuation of U.S. patent application Ser. No. 15/065,731 filed on Mar. 9, 2016, now U.S. Pat. No. 10,433,285, which is related to and claims priority under 35 U.S.C. § 119(a) to Korean Patent Application No. 10-2015-0032705 filed on Mar. 9, 2015, the disclosures of which are herein incorporated by reference in their entirety.

BACKGROUND

1. Field

The present disclosure relates to a method and apparatus of controlling electronic device in a communication system, and more particularly, to a method and apparatus of controlling the other electronic devices through one electronic device in a communication system.

2. Description of Related Art

In recent years, with the rapid development of technology, cases where one user has two or more electronic device in his/her name have been on an increasing trend. Examples of the electronic devices that have been most widely spread are mobile phones, smartphones, etc., performing communication. Recently, a variety of electronic devices that may be used with smartphones have been released on the markets, e.g., smart watches, smart glasses, tablet computers, etc., which are equipped with a communication function. In addition, systems for controlling a variety of electronic devices at home by using smart phones have been developed. For example, systems have been developed to control various electronic devices, e.g., a TV, washing machine, refrigerator, micro-oven, gas stove, electric heater, lights, etc., by a specific electronic device such as a smart phone.

A variety of electronic devices that users may usually carry have been developed, for example: a smart watch with a voice communication function; smart glasses with a communication function, a tablet computer; users' vital signal monitoring systems such as an electronic heart rate measuring device, a body temperature measuring device, a blood pressure measuring device; etc.

When one user carries two or more electronic devices or lives with the devices worn on his/her body, a case where all the devices need to perform the same operation may occur. In that case, the user may have difficulty in controlling functions of the devices or altering in the mode or settings of the devices, respectively.

SUMMARY

The present disclosure has been made in view of the above problems, and provides a method and apparatus that can control a variety of electronic devices carried by a user or worn on a user's body by controlling a single electronic device.

To address the above-discussed deficiencies, it is a primary object to provide a method and apparatus that can transmit, when a specific command is input to one electronic device, input commands to the other electronic devices that need to perform corresponding commands, and can simultaneously or sequentially control the other electronic devices.

An electronic device for executing a control command includes a communication unit configured to communicate with another electronic device or a server, a memory configured to store group information on a group comprising the electronic device and at least one other electronic device, and a controller configured to receive the control command, determine whether the control command is a group control command to be executed in the at least one other electronic device of the group, and transmit the control command to the at least one other electronic device of the group when the control command is the group control command.

In accordance with various embodiments of the present disclosure, the present disclosure provides a method of executing control commands in an electronic device capable of communicating with at least one of other electronic devices including receiving a control command required for operation of the electronic device; executing the received control command, determining whether the received control command is a group control command that other electronic devices need to execute in the same way as the electronic device, and transmitting, when the received control command is a group control command, the control command to at least one of other electronic devices as group control objects.

In accordance with various embodiments of the present disclosure, the present disclosure provides an electronic device for executing control commands includes: a communication unit for communicating with at least one of other electronic devices; a memory for storing identification information about other electronic devices to execute a group control command; and a controller for: executing, when receiving the control command, the received control command; determining whether the received control command is a group control command that other electronic devices need to execute in the same way as the electronic device; reading, when the received control command is a group control command, identification information about at least one of other electronic devices as group control objects from the memory; and transmitting the identification information to other electronic devices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a signal flow chart that describes a method of cooperating with electronic devices when a control command is input to a first electronic device that needs to cooperate with the other electronic devices, according to the present disclosure;

DETAILED DESCRIPTION

Figure 1:
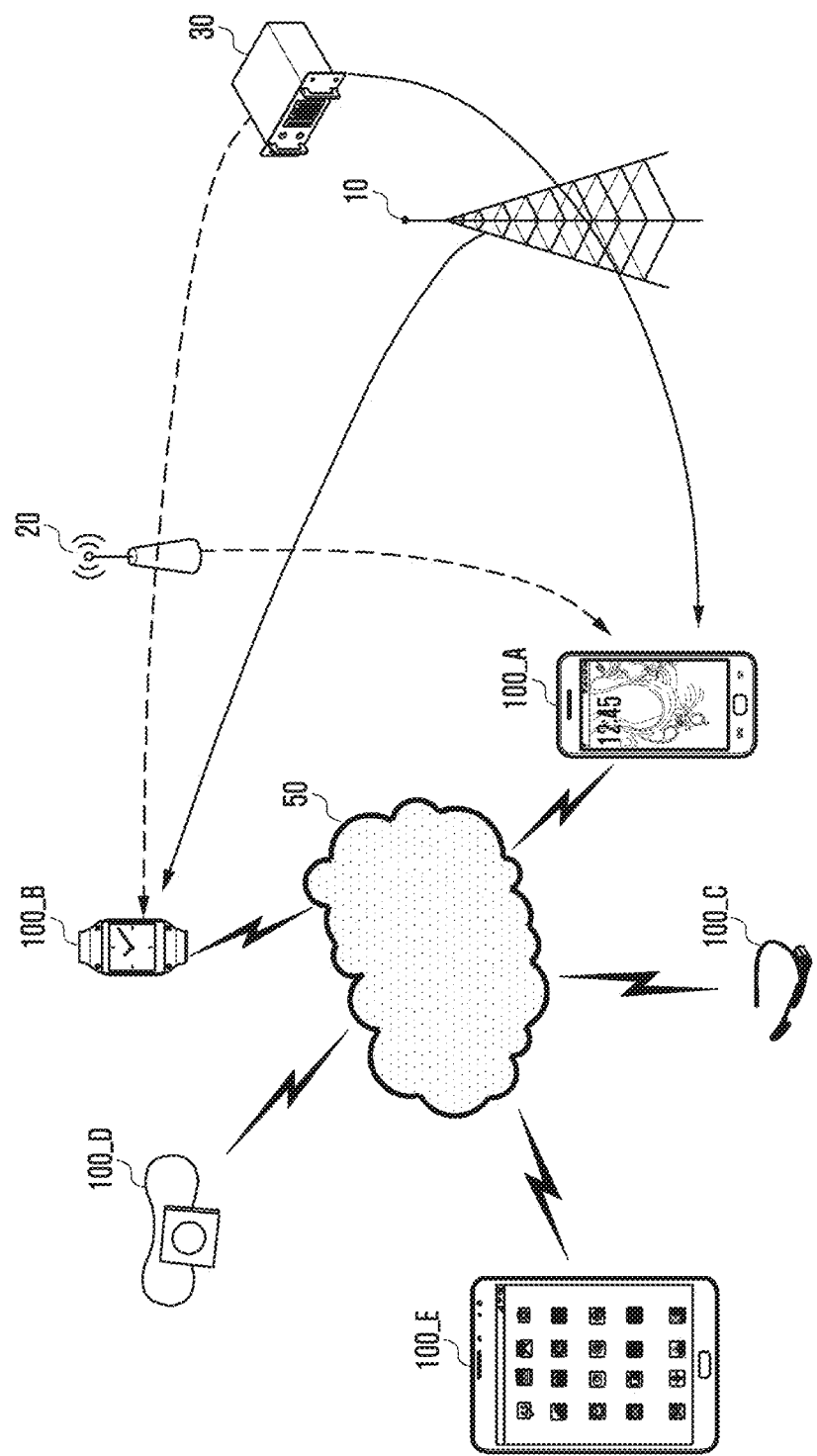
FIG. 1 is a conceptual schematic diagram of a wireless communication system and electronic devices with communication functions.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, the present disclosure will be described in detail with reference to the accompanying drawings. It will be easily appreciated to those skilled in the art that various modifications, additions and substitutions are possible from the embodiments of the disclosure that are illustrated and described in detail in the following description, and the scope of the disclosure should not be limited to the following embodiments. The embodiments of the present disclosure are provided such that those skilled in the art completely understand the disclosure. It should be understood that the disclosure may include all modifications and/or equivalents and/or substations included in the idea and technical scope of the present disclosure. In the drawings, the same or similar elements are denoted by the same reference numerals even though they are depicted in different drawings.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

FIG. 1 is a conceptual schematic diagram of a wireless communication system and electronic devices with communication functions.

It should be understood that the electronic devices 100_A, 100_B, 100_C, 100_D and 100_E shown in FIG. 1 can also configure an inter-device network with other types of electronic devices (not shown). For example, various types of home appliances such as wired-line/wireless phones, a smart refrigerator, a smart oven, etc. can also be included in the inter-device network. For the sake of convenient description, the following embodiments will be described based on the components shown in FIG. 1.

Referring to FIG. 1, the components are described as follows. It is assumed that the electronic devices 100_A, 100_B, 100_C, 100_D and 100_E that can wirelessly communicate with each other are in a state where they can also wirelessly communicate other electronic devices. The electronic devices 100_A, 100_B, 100_C, 100_D and 100_E can also communicate with each other or other electronic devices in wire mode. For the sake of convenient description, the following embodiments are described, assuming that the electronic devices 100_A, 100_B, 100_C, 100_D and 100_E can be wirelessly communicated with each other.

In the embodiment shown in FIG. 1, a first electronic device 100_A can be a smart phone, a second electronic device 100_B can be a smart watch (e.g., The Samsung Galaxy Gear, etc.), a third electronic device 100_C can be smart glasses (e.g., Google Glass, etc.), a fourth electronic device 100_D can be a health monitoring device, and a fifth electronic device can be a tablet computer.

The electronic devices 100_A, 100_B, 100_C, 100_D and 100_E can be mutually communicated in a specific communication mode, e.g., D2D communication or Wi-Fi communication mode or Bluetooth communication mode or in one or more of the wireless communication modes, such as a communication mode independently implemented by a company manufacturing a specific type of electronic device, etc. Each of the electronic devices 100_A, 100_B, 100_C, 100_D and 100_E can provide corresponding information required for the present disclosure to the other electronic devices through the inter-device network 50.

The embodiment shown in FIG. 1 illustrates the electronic devices 100_A and 100_B that can communicate with the other electronic devices 100_C, 100_D and 100_E in wireless inter-device communication and with an external network. For example, the smart phone 100_A, smart watch 100_B or tablet computer 100_E can communicate with correspond node (CN) 30 on the external network through an access point (AP) 20 providing a Wi-Fi service. The CN 30 can be a specific server located on a network or user equipment through a communication network. The present disclosure is not limited by the CN 30.

The smart phone 100_A, smart watch 100_B or tablet computer 100_E can also communicate with the CN 30 located on a network through eNB 10 providing a mobile communication service.

The basic operations of the respective electronic devices 100_A, 100_B, 100_C, 100_D and 100_E shown in FIG. 1 are briefly described as follows.

The smart phone 100_A can be equipped with a variety of wireless communication functions as described above. The smart phone 100_A can communicate with the CN 30 and can also run the various built-in applications. The configuration and operations of the smart phone 100_A will be further described later referring to the accompanying drawings.

The smart watch 100_B can be equipped with similar components or functions to the smart phone 100_A or the tablet computer 100_E. For example, the smart watch 100_B can be an electronic device such as The Samsung Galaxy Gear. The smart watch 100_B can be used when performing a wireless communication function, in dependence on or independence from the smart phone 100_A or the tablet computer 100_E. Therefore, the configuration of the smart watch 100_B can include a part or all of the components of the smart phone 100_A that will be described later.

Like the smart watch 100_B, the smart glasses 100_C can perform similar functions to the smart phone 100_A or the tablet computer 100_E. For example, the smart glasses 100_C can be an electronic device such as Google Glass. The smart glasses 100_C can be used when performing a wireless communication function, in dependence on or independence from the smart phone 100_A or the tablet computer 100_E. Therefore, the configuration of the smart glasses 100_C can include a part or all of the components of the smart phone 100_A that will be described later.

The health monitoring device 100_D can be medical equipment that can monitor at least one vital sign for the body's basic functions: pulse, blood pressure, blood sugar, body temperature, etc. The health monitoring device 100_D can measure the wearer's body function, show the measured result or the alert sign, or provide the measured result to the other electronic device. In order to provide the measured result to the other electronic device, the health monitoring device 100_D can include a module that can perform wired/wireless communication.

As described above, the number of electronic devices that one user can carry or can individually use increases. Therefore, it is hard for one user to separately or independently control his/her electronic devices.

Therefore, the present disclosure defines commands for the respective electronic devices to be simultaneously or sequentially controlled with other electronic devices. When a command is requested for the respective electronic devices to be simultaneously or sequentially controlled with other electronic devices, a corresponding command is provided to the respective electronic devices that have been registered. To this end, the respective electronic devices 100_A, 100_B, 100_C, 100_D and 100_E can store information about at least one of the other electronic devices. For example, although the health monitoring device 100_D can be equipped with an LCD, keyboards, etc. to provide input convenience to the user, an electronic device such as a smart phone 100_A or tablet computer 100_E can be registered and used as a master electronic device. In that case, the health monitoring device 100_D can register information about the master electronic device and can include a module that can communicate with the master electronic device in wired/wireless mode.

Like the smart phone 100_A, the smart watch 100_B, smart glasses 100_C or tablet computer 100_E can also be a master electronic device. When one user has two or more electronic devices with a user interface, an input unit and a communication function, a master condition can be set and a determination can be made as to whether the electronic device is a master.

There can be a variety of methods to set a master condition. First, when a user has set a specific electronic device as a master, the specific electronic device can be a master. Second, when a user has not set a specific electronic device as a master electronic device, an electronic device that the user wears or carries can be set as a master. Third, when a user has not set a specific electronic device as a master electronic device, an electronic device with receiving a command can be set as a master only for once. Fourth, when a user has not set a specific electronic device as a master electronic device, an electronic device that has satisfied a preset condition the highest number of times can be a master. Examples of the preset condition can be as follows: Condition 1: to determine whether a user interface, e.g., a display and an input unit, can be provided; Condition 1-1: of two or more electronic devices with a user interface, an electronic device with a larger display than the others; Condition 2: to determine an electronic device with a higher frequency of using a corresponding function; and Condition 3: to determine whether a user wears or carries. The conditions described above can be prioritized. It should be understood that the conditions 1, 2 and 3 are listed not in order of priority but in types. When there are two or more electronic devices satisfying Condition 1, a determination can further made whether the electronic devices satisfy Condition 1-1.

The following description is provided about controls commands that need to cooperate with each other or to operate individually in electronic devices carried by or worn on one user. The control commands are sorted into three categories. However, it should be understood that the control commands can further be sorted into four or more categories: (1) a type of command to operate only a single specific electronic device; (2) a type of command to be applied to all of the registered electronic devices; (3) a type of command to be applied to a part of the registered electronic device Commands according to the features listed above are described in detail below.

(1) a type of command to operate only a single specific electronic device: Commands for operating each of the electronic devices shown in FIG. 1 can be different from each other. For example, in the case of a smart phone 100_A, there are commands that are operating in only the electronic device that are currently used, e.g., a call command, a chatting command, an Internet search command, a command for executing a game, etc. In addition, in the case where a voice call is received and the incoming calling is received in a smart watch 100_B, the operation for the call connection can be a command to be operated in only the smart watch 100_B. As another example, in the case of smart glasses 100_C, there can be a command that need to provide a specific screen through only the smart glasses 100_C. In addition, in the case of a heath monitoring device 100_D, a command that corresponding medical equipment needs to perform can be a typical example.

(2) a type of command to be applied to all of the registered electronic devices: A command to be applied to all of the registered electronic devices can be previously set by the users or when electronic products are manufactured. For example, in the case of an airplane mode, since communication by electronic devices can cause interference with the airplane flight, the command can be commonly applied to all the electronic devices. As another example, it is preferable that the setting to a manner or vibrate mode in a movie theater, a theater, etc., is commonly applied to all the electronic devices. As another example, there can be a case where communication is restricted in an area, such as a hospital where electronic medical equipment is used, or a case where communication restriction is set in an area where communication needs to be restricted for a period of time, such as an emergency or disaster area, etc. It should be understood that there can be a variety of cases where a command needs to be applied to all of the registered electronic devices. Since all of the cases cannot be explained in the following description, a mode for setting an airplane mode as a typical case will be described in detail.

When a user inputs a specific command, e.g., an airplane mode setting command, to an electronic device, the electronic device that has received the command can set all from among the other electronic devices that the corresponding user has registered as personal electronic devices and that are located in the communication area to execute the same command. On the contrary, when an airplane mode terminating command is input to the electronic device, the electronic device set all from among the other electronic devices that the user has registered as personal electronic devices and that are located in the communication area to execute the same airplane mode terminating command.

(3) a type of command to be applied to a part of the registered electronic device: There can be a command that need to be applied to a part of the personal electronic devices. For example, a particular user, such as a patient who has a symptom of abnormal heart rhythm or pulse, can set a specific electronic device to a silent mode or a vibrate mode where notification is provided with vibration in a movie theater or a theater. When one of the electronic devices carried by or worn on the user is a health monitoring device 100_D and the abnormal symptom has occurred to the user, notifying other people of the user's emergent situation may not be enough with only signals from the silent mode or the vibration mode. Therefore, for such as case, a part of the medical equipment needs to be excluded.

As another example, a user can control a specific electronic device, e.g., a smart phone 100_A, so that the smart phone 100_A and a part of the electronic devices that have been registered can just operate. For example, when a user sets a smart phone 100_A to cooperate with one or more wireless speakers (not shown) in outputting audio or music, the other electronic devices that the user has registered can also cooperate with the speakers. As another example, when a user needs a video of a digital camera (not shown) to cooperate with a smart television (not shown) and an audio system (not shown), a setting can be set to cooperate with the corresponding electronic devices.

It can be preferable that, when a schedule inputting is performed, the input schedule content is stored in all of the electronic devices that can display schedule content. A setting can be set so that, when an alarm inputting is performed, the input alarm content is also input to the other electronic devices that can provide the alarm content according to a user's selection.

The electronic device according to the present disclosure can be a device including a communication function. For example, the electronic device corresponds to a combination of one or more of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., MP3 player), a mobile medical device, a camera, or a wearable device. Examples of the wearable device are a head-mounted-device (HIVID) (e.g., electronic eyeglasses), electronic clothing, an electronic bracelet, an electronic necklace, an accessory, an electronic tattoo, a smart watch, etc.

The electronic device according to embodiments of the present disclosure can be smart home appliances with a communication function. Examples of the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync® Apple TV®, or Google TV®), a game console, an electronic dictionary, an electronic key, a camcorder, an electronic album, or the like.

The electronic device according to other embodiments of the present disclosure can include at least one of the following: medical devices (e.g., Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicles, an industrial or home robot, an automatic teller's machine (ATM), a point of sales (POS) system, etc.

The electronic device according to other embodiments of the present disclosure can include at least one of the following: furniture or a portion of a building/structure, an electronic board, an electronic signature receiving device, a projector, various measuring instruments (e.g., a water meter, an electric meter, a gas meter and a wave meter), etc., which are equipped with a communication function, respectively. The electronic device according to the present disclosure can also include one or more or a combination of the devices listed above. In addition, the electronic device according to the present disclosure can be a flexible device. It is obvious to those skilled in the art that the electronic device according to the present disclosure is not limited to the aforementioned devices.

Figure 2:
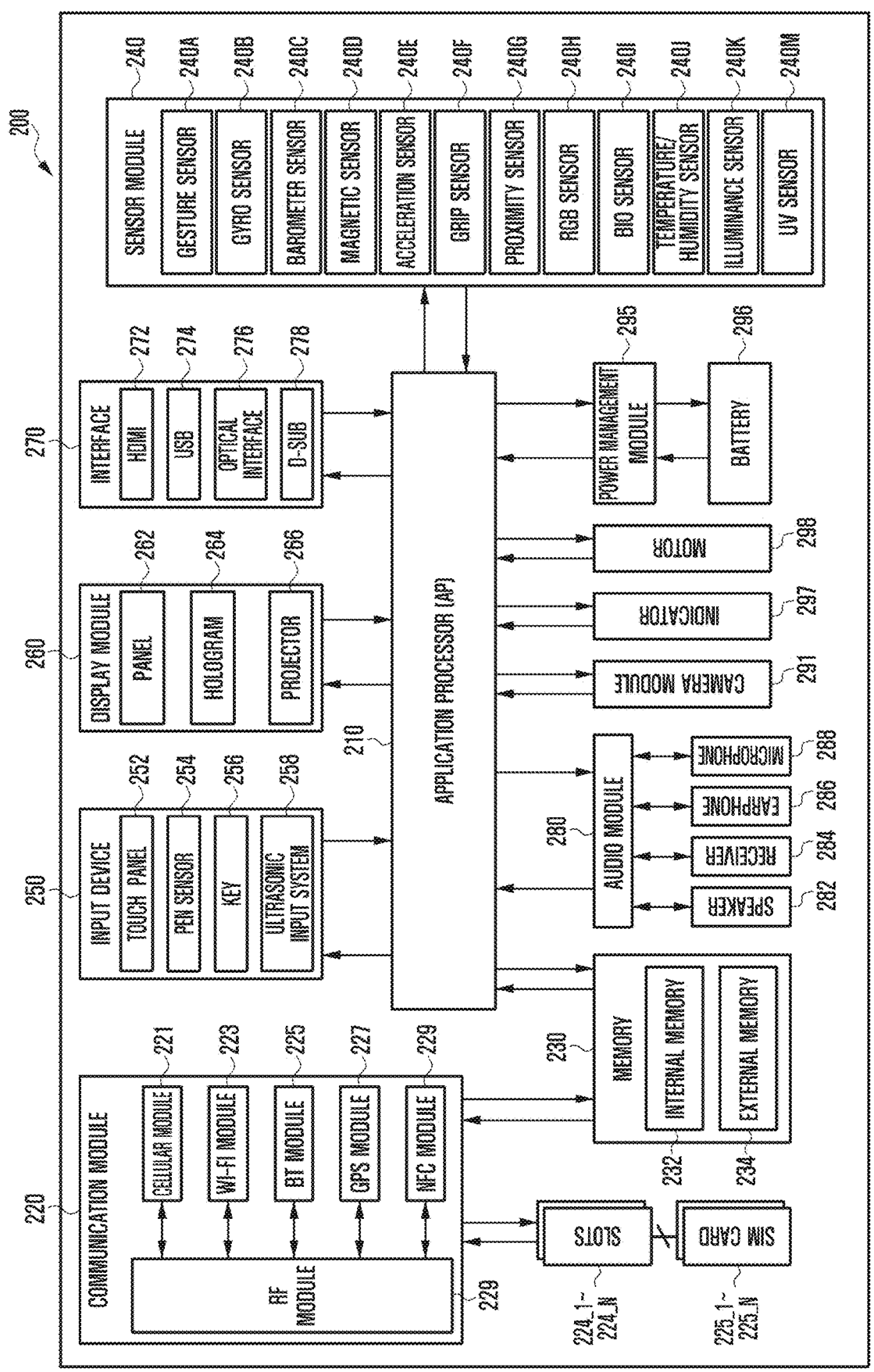
FIG. 2 is a schematic block diagram of an electronic device according to an embodiment of the present disclosure.

FIG. 2 is a schematic block diagram of an electronic device according to an embodiment of the present disclosure.

It is assumed that the electronic device 200 can be a part or all of one of the electronic devices 100_A, 100_B, 100_C, 100_D and 100_E shown in FIG. 1 and a first electronic device 100_A is a smart phone.

Referring to FIG. 2, the electronic device 200 can include one or more processors of the application processor (AP) 210, a communication module 220, subscriber identification module (SIM) cards 225_1~225_N, SIM card slots 224_1~224_N, a memory 230, a sensor module 240, an input system 250, a display 260, an interface 270, an audio module 280, a camera module 291, a power management module 295, a battery 296, an indicator 297, and a motor 298.

The application processor (AP) 210 can control a plurality of hardware or software components connected thereto by executing the operation system or applications, process data including multimedia data, and perform corresponding operations. The AP 210 can be implemented with a system on chip (SoC). According to an embodiment, the AP 210 can further include a graphic processing unit (GPU). When the AP 210 needs to simultaneously or sequentially perform the same command with other electronic device, the AP 10 can perform a controlling operation according to the command. The information about electronic devices that need to simultaneously or sequentially perform the same command can be stored in the memory 230. This operation will be described in detail later referring to the control flow chart.

The communication module 220 can perform communication for data transmission/reception between the electronic device 200 and the other electronic devices connected to each other via the network. According to an embodiment, the communication module 220 can include a cellular module 221, a Wi-Fi module 223, a BT module 225, a GPS module 227, an NFC module 228 and a radio frequency (RF) module 229. Therefore, the communication module 220 can provide information about commands that need to be performed with other electronic devices to a corresponding electronic device or can receive the information. The communication module 220 can include components as follows. Although the embodiment shown in FIG. 2 is implemented in such a way that the communication module 220 includes a cellular module 221, a Wi-Fi module 223, a BT module 225, a GPS module 227, an NFC module 228 and a radio frequency (RF) module 229, it should be understood that the communication module 220 can further include a module that supports other communication modes, e.g., a wireless communication mode independently implemented by an electronic device manufacturer or a module that supports other types of communication modes.

The cellular module 221 can provide voice call, video call, SMS or Internet service, etc., via a communication network (e.g., LTE, LTE-A, CDMA, WCDMA, UMTS, Wi-Bro, GSM, etc.). The cellular module 221 can perform identification or authentication for electronic devices in a communication network by using their subscriber identification module (e.g., SIM card 224). According to an embodiment, the cellular module 221 can perform a part of the functions of the AP 210. For example, the cellular module 221 can perform a part of the functions for controlling multimedia.

According to an embodiment, the cellular module 221 can include a communication processor (CP) not shown in FIG. 2. The cellular module 221 can be implemented with, for example, SoC. Although the embodiment shown in FIG. 2 is implemented in such a way that the cellular module 221 (e.g., communication processor), the power management module 295, the memory 230, etc., are separated from the AP 210, it can be modified in such a way that the AP 210 includes at least a part of those components (e.g., cellular module 221). It can also be modified in such a way that the AP 210 includes all of those components.

According to an embodiment, the AP 210 or the cellular module 221 can load commands or data transmitted from at least one of the following: non-volatile memory or other components, on volatile memory and then process the commands and data. The AP 210 or the cellular module 221 can store data in a non-volatile memory, which is transmitted from/created in at least one of the other components.

The Wi-Fi module 223, the BT module 225, the GPS module 227 and the NFC module 228 can each include processors (not shown) for transmitting/receiving data through corresponding modules. Although the embodiment shown in FIG. 2 is implemented in such a way that the cellular module 221, Wi-Fi module 223, BT module 225, GPS module 227, and NFC module 228 are separated from each other, it can be modified in such a way that at least a part of those components (e.g., two or more) are included in an integrated chip (IC) or an IC package. For example, at least a part of the processors corresponding to the cellular module 221, Wi-Fi module 223, BT module 225, GPS module 227, and NFC module 228, e.g., a communication processor corresponding to the cellular module 221 and a Wi-Fi processor corresponding to the Wi-Fi 233, can be implemented with a SoC.

The radio frequency (RF) module 229 can transmit or receive data, e.g., RF signals. The RF module 229 can include a transceiver, a power amplifier module (PAM), a frequency filter, a low noise amplifier (LNA), etc. The RF module 229 can also include parts for transmitting/receiving electromagnetic waves, e.g., conductors, wires, etc., via free space during wireless communication. Although the embodiment shown in FIG. 2 is implemented in such a way that the cellular module 221, Wi-Fi module 223, BT module 225, GPS module 227, and NFC module 228 share the RF module 229, it can be modified in such a way that at least one of those components transmits or receives RF signals via a separate RF module.

The subscriber identification module (SIM) cards 225_1 to 225_N can be cards with subscriber identification modules (SIMs). The SIM cards 225_1 to 225_N can be fitted into slots 224_1 to 224_N of the electronic device. The SIM cards 225_1 to 225_N can include unique identification information, e.g., integrated circuit card identifier (ICCID), or subscriber information, e.g., international mobile subscriber identity (IMSI). The SIM cards 225_1 to 225_N can further store information about other electronic devices of a corresponding user. For example, when a first electronic device 100_A shown in FIG. 1 is a smart phone, the SIM cards 225_1 to 225_N can further store information about at least one of the following: second electronic device 100_B, third electronic device 100_C, and fourth electronic device 100_D.

The memory 230 can include built-in memory 232 and/or external memory 234. The built-in memory 232 can include at least one of the following: volatile memory, e.g., dynamic RAM (DRAM), static RAM (SRAM), synchronous dynamic RAM (SDRAM), etc., non-volatile memory, e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.

According to an embodiment, the built-in memory 232 can be a Sold State Drive (SSD). The external memory 234 can further include: a flash drive, e.g., compact flash (CF), secure digital (SD), micro-secure digital (micro-SD), mini-secure digital (mini-SD), extreme digital (XD); a memory stick; etc. The external memory 234 can be functionally connected to the electronic device 200 via various types of interface. According to an embodiment, the electronic device 200 can further include storage devices (or storage media) such as hard drives. In addition, when the SIM cards 225_1 to 225_N do not store information about other electronic devices, the memory 230 can store the information about other electronic devices of a corresponding user. In that case, although the memory 230 can be the built-in memory 232 and/or external memory 234, it is preferable that the information is stored in the built-in memory 232.

The memory 220 can store a list of electronic devices that belong to one user and have a communication function and the identification information for communication. A plurality of electronic devices used by one user can be registered and stored in a memory in a format by obtaining the identifiers of the other electronic devices, e.g., MAC address, by a mutual search process. When a user assigns a name to the other electronic device, e.g., when a user assigns a 'Mini Clock' as a name to a smart watch and stores the name in the electronic device, the information about the corresponding name can be obtained along with the identifier information about a corresponding electronic device and the information can be stored together. If a user does not assign a name, the name set by the manufacturer can be obtained along with the identifier information and can be stored.

In addition, the memory 220 can store information about electronic devices that need to cooperate with a specific control command as group control information. This group control information can include identifier information about other electronic devices that will be operating with control commands. Information stored as described above can be shown as the following table 1.

TABLE 1

| Control commands | Device identifiers of group control | Electronic Devices | Descriptions |
|---|---|---|---|
| Airplane mode | 00-00-00-1E-01-F3 | My phone | Smart phone |
| | 00-00-A1-E0-01-E3 | My tablet | Tablet computer |
| | 00-00-11-C1-01-CC | Mini clock | Smart watch |
| | 00-00-02-1E-A2-E0 | Circular glasses | Smart glasses |
| | 00-00-01-E2-AA-E0 | MedPulChk-01S0 | Heart rate monitoring |
| Silent (vibrate) mode | 00-00-00-1E-01-F3 | My phone | Smart phone |
| | 00-00-A1-E0-01-E3 | My tablet | Tablet computer |
| | 00-00-11-C1-01-CC | Mini clock | Smart watch |
| | 00-00-02-1E-A2-E0 | Circular glasses | Smart glasses |

TABLE 1-continued

| Control commands | Device identifiers of group control | Electronic Devices | Descriptions |
|---|---|---|---|
| Voice signal incoming | 00-00-00-1E-01-F3 | My phone | Smart phone |
| | 00-00-11-C1-01-CC | Mini clock | Smart watch |
| . . . | . . . | . . . | . . . |

As shown in table 1, identifier information about electronic devices that can be group-controlled corresponding to a particular group control command and the names of the electronic devices can be stored. Related descriptions can be further included in the table, if necessary. The information stored in table 1 is an example. It should be understood that information that can be additionally stored, besides the group control commands and group control device identifiers, can be added, deleted, and altered for the sake of convenience of service providers or the user.

In addition, the information described in table 1 can be formed to be stored: in a memory of only an electronic device set as a mater, in the memory of all of the electronic devices, or in the memory of only the electronic devices that can be set as a master.

The sensor module 240 can measure physical quantity or sense operation states of the electronic device 200 and convert the measured or sensed data to electrical signals. The sensor module 240 can include at least one of the following: gesture sensor 240A, gyro sensor 240B, atmospheric pressure sensor 240C, magnetic sensor 240D, acceleration sensor 240E, grip sensor 240F, proximity sensor 240G, color sensor 240H (e.g., red-green-blue (RGB) sensor), biosensor 240I, temperature/humidity sensor 240J, illuminance sensor 240K, and ultra-violet (UV) sensor 240M. Additionally or alternatively, the sensor module 240 can also include an e-nose sensor (not shown), electromyography (EMG) sensor (not shown), an electroencephalogram (EEG) sensor (not shown), an electrocardiogram (ECG) sensor (not shown), Infra-Red (IR) sensor (not shown), iris sensor (not shown), a fingerprint sensor (not shown), a grip sensor (not shown), etc. The sensor module 240 can further include a control circuit for controlling at least one of the sensors.

The input system 250 can include a touch panel 252, a pen sensor 254 (i.e., a digital pen sensor), a key 256 and an ultrasonic input system 258. The touch panel 252 can senses touches in at least one of the following: capacitive sensing mode, pressure sensing mode, infrared sensing mode, and ultrasonic sensing mode. The touch panel 252 can further include a control circuit. When the touch panel 252 is designed to operate in capacitive sensing mode, it can sense physical touches or proximity of an object. The touch panel 252 can further include a tactile layer. In that case, the touch panel 252 can provide tactile feedback to the user.

The pen sensor 254 (i.e., digital pen sensor) can be implemented in the same or similar fashion as receiving a user's touch input or by using a separate recognition sheet. The key 256 can include physical buttons, optical keys or a key pad. The ultrasonic input system 258 is a device that can sense sounds via a microphone 288 of the electronic device 200 by using an input tool for generating ultrasonic signals and can identify the data. The ultrasonic input system 258 can sense signals in wireless mode. According to an embodiment, the electronic device 200 can receive a user's inputs from an external system (e.g., a computer or server) via the communication module 220.

The display 260 can include a panel 262, a hologram unit 264, or a projector 266. The panel 262 can be implemented with a Liquid Crystal Display (LCD), Active Matrix Organic Light Emitting Diodes (AMOLEDs), or the like. The panel 262 can be implemented in a flexible, transparent, or wearable form. The panel 262 can form a single module with the touch panel 252. The hologram unit 264 shows a three-dimensional image in the air using interference of light. The projector 226 can display images by projecting light on a screen. The screen can be placed, for example, inside or outside the electronic device 200. According to an embodiment, the display 260 can further include a control circuit for controlling the panel 262, the hologram unit 264, or the projector 266.

The interface 270 can include a high-definition multimedia interface (HDMI) 272, a universal serial bus (USB) 274, an optical interface 276, a D-subminiature (D-sub) 278, etc. Additionally or alternatively, the interface 270 can include a mobile high-media card (MHL) interface, a secure digital (SD) card/multi-media card (MMC) interface, an infrared data association (IrDA) interface, or the like.

The audio module 280 can make conversion between audios and electrical signals. The audio module 280 can process audio information output from/input to a speaker 282, a receiver 284, earphones 286, a microphone 288, etc.

The camera module 291 can take still images or moving images. According to an embodiment, the camera module 291 can include one or more image sensors (e.g., on front side and/or back side), a lens (not shown), an image signal processor (ISP) (not shown), a flash (e.g., LED or a xenon lamp) (not shown), or the like.

The power management module 295 can manage electric power of the electronic device 200. The power management module 295 can include a power management integrated circuit (PMIC), a charger integrated circuit (IC), a battery or fuel gauge, etc. The PMIC can be implemented in the form of IC chip or SoC. Charging electric power can be performed in wired or wireless mode. The charger IC can charge a battery, preventing input over-voltage or input over-current from inputting to the battery from a charger. According to an embodiment, the charger IC can be implemented with wired charging type and/or wireless charging type. Examples of the wireless charging type of charger IC are a magnetic resonance type, a magnetic induction type, an electromagnetic wave type, etc. If the charger IC is a wireless charging type, it can include an additional circuit for wireless charging, e.g., a coil loop unit, a resonance circuit, a rectifier, etc. The battery gauge can measure the residual amount of battery 296, the level of voltage, the level of current, temperature during the charge.

The battery 296 charges electric power or supplies electric power to the electronic device 200. The battery 296 can include a rechargeable battery or a solar battery.

The indicator 297 shows states of the electronic device 200 or of the parts (e.g., AP 210), e.g., a booting state, a message state, a recharging state, etc. The motor 298 converts an electrical signal into a mechanical vibration. Although it is not shown, the electronic device 200 can include a processor for supporting a mobile TV, e.g., a graphic processing unit (GPU). The processor for supporting a mobile TV can process media data that comply with standards of digital multimedia broadcasting (DMB), digital video broadcasting (DVB), media flow, etc.

Each of the elements/units of the electronic device according to the present disclosure can be implemented with one or more components, and corresponding component can be called different names according to types of electronic devices. The electronic device according to the present disclosure can include at least one element described above. The electronic device can be modified in such a way as to: remove a part of the elements or include new elements. In addition, the electronic device according to the present disclosure can also be modified in such a way that parts of the elements are integrated into one entity that performs their original functions.

In the present disclosure, the terminology module' refers to a 'unit' including hardware, software, firmware or a combination thereof. For example, the terminology '~module' is interchangeable with '~unit,' '~logic,' '~logical block,' '~component,' '~circuit,' etc. A 'module' can be the least unit or a part of an integrated component. A 'module' can be the least unit or a part thereof that can perform one or more functions. A 'module' can be implemented in mechanical or electronic mode. For example, 'modules' according to the present disclosure can be implemented with at least one of the following: an application specific integrated circuit (ASIC) chip, field-programmable gate array (FPGAs) and a programmable-logic device that can perform functions that are known or will be developed.

Figure 3:
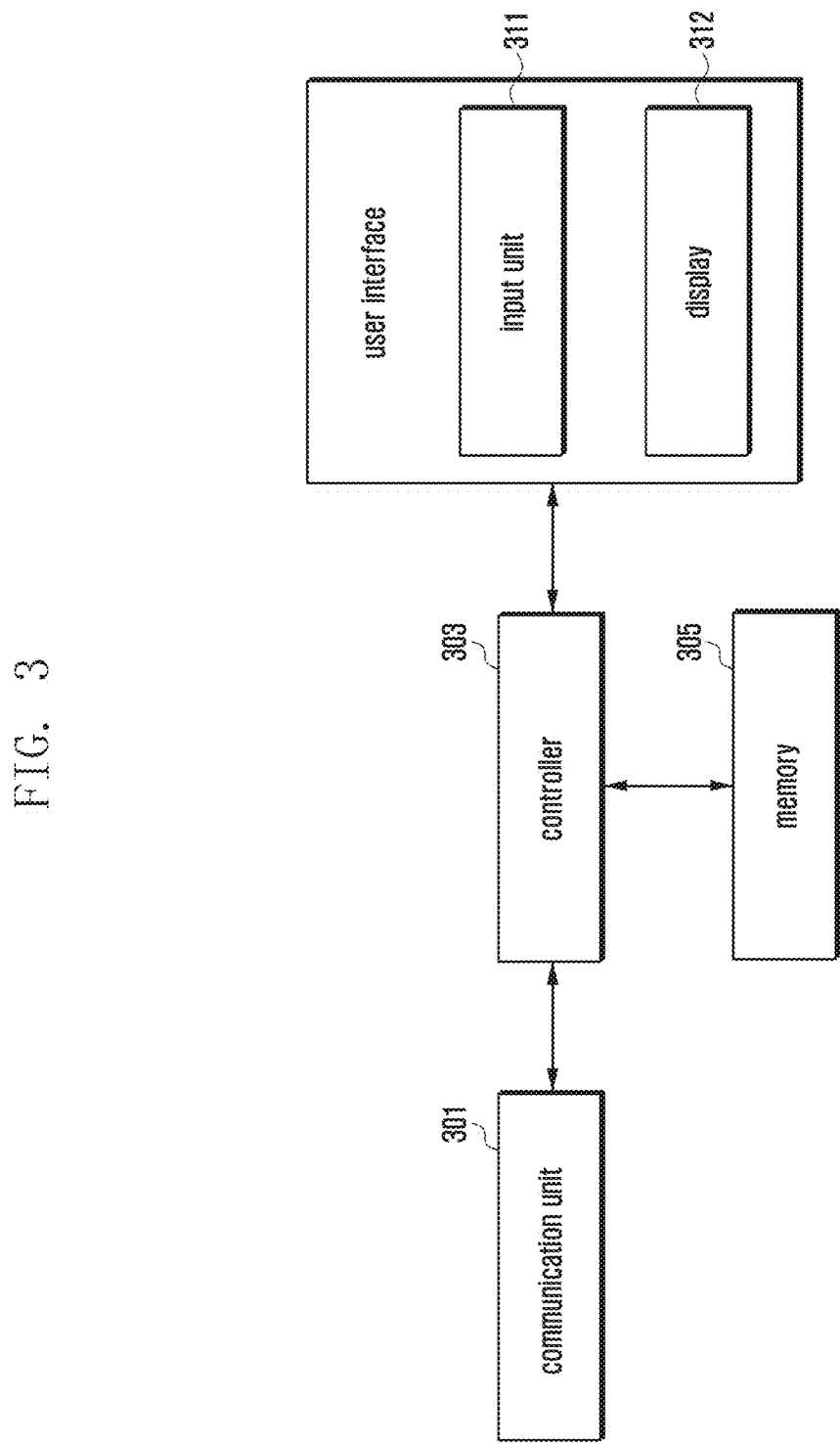
FIG. 3 is a schematic block diagram of an electronic device according to another embodiment of the present disclosure.

FIG. 3 is a schematic block diagram of an electronic device according to another embodiment of the present disclosure.

FIG. 3 shows another type of configuration of the electronic device shown in FIG. 2. Referring to FIG. 3, the communication unit 301 includes a module (not shown in FIG. 3) for making a communication, in wired/wireless mode, between electronic devices according to the present disclosure. Although the module can make a communication, in wired/wireless mode, between electronic devices, it is assumed that the module runs in wireless communication mode. The communication unit 301 can further include at least one module for supporting other types of communication modes, e.g., a cellular module 221 shown in FIG. 2, in order to support communication between electronic devices. In addition, the communication unit 301 can further include an RF module 229 shown in FIG. 2 to support wireless communication.

The controller 303 can correspond to the application processor 210 shown in FIG. 2 or can include a module for processing data transmitted or received by the communication unit 301 and the AP 210. In the following description, for the sake of convenient description, it is assumed that the controller 303 includes a module for processing data transmitted or received by the communication unit 301 and the AP 210 shown in FIG. 2. Therefore, the controller 303 can perform a control operation of a command that needs to be performed only in a specific electronic device, a control operation of a command that needs to be simultaneously or sequentially performed in electronic devices set to a specific group, and a control operation of a command that needs to be simultaneously or sequentially performed in all of the electronic devices registered in one user.

The memory 305 can correspond to the memory 230 shown in FIG. 2. The memory 305 can include only the built-in memory 232 shown in FIG. 2 or can include an interface for connecting to the external memory 234 shown in FIG. 2. The memory 305 can store information about group control electronic devices and a group control command for a command that need to be simultaneously or sequentially performed with the other electronic devices, and also store program data for performing the operations. The information about group control electronic devices and a group control command for a command that need to be simultaneously or sequentially performed with the other electronic devices can be information described in table 1.

Group information about group control electronic devices stored in the memory 305 is described. As described above, information about a command that need to be performed in only one electronic device may not have specific group information. However, a command that needs to be simultaneously or sequentially performed in two or more electronic devices can be stored in the memory 305 along with group information about electronic devices that need to be performed together.

As an example, group information about electronic devices for group control for outputting music is described. Information about one or more wireless speakers that can cooperate with a specific electronic device can be stored, as one group information item, in the memory 305.

As another example, when a video of a digital camera with a recording function cooperates with a smart television and an audio system, the group information about electronic devices for group control, digital camera, smart television, and audio system, can be stored, as group information, in the memory 305.

As still another example, when a schedule inputting is performed in a specific electronic device and the input schedule contents are grouped to cooperate with the electronic devices that can display schedule contents, the group information can be stored in the memory 305. The group information can be registered in only the main electronic device or equally stored in all of the electronic devices.

The group information items described above can be stored as one group information item or can be as group information items corresponding to respective commands in the memory 305.

The user interface 310 can be an input system for providing a user's input convenience and an interface that can provide a user with information through visual sense, hearing sense, tactile sensation, sense of smell, etc. The user interface 310 includes an input unit 311 and a display 312 as shown in FIG. 3.

The input unit 311 of the user interface 310 can include modules for allowing the user to input commands in the electronic device. For example, the input unit 311 can also include at least one key, a touch sensor for recognizing touches, a command input detection system (e.g., a module for recognizing a pen input) for allowing the user to input commands by using another input system, a grip sensor for determining whether a user performs a griping operation, etc. The input unit 311 can also include a variety of sensors or input systems shown in FIG. 2.

The display 312 of the user interface 310 can include a display module that can provide the user with characters, numbers, graphics, videos, etc. The user interface 310 can further include modules that can provide the user with information through vision, hearing, tactile, vibration or smell by an interface module that provides the user with senses through the finger or skin, a motor, a speaker, or the like.

It will be appreciated that the electronic device shown in FIG. 3 includes primary parts for the present disclosure. It should be understood that the battery and other components that can be included in the electronic device are not shown in FIG. 3.

Figure 4:
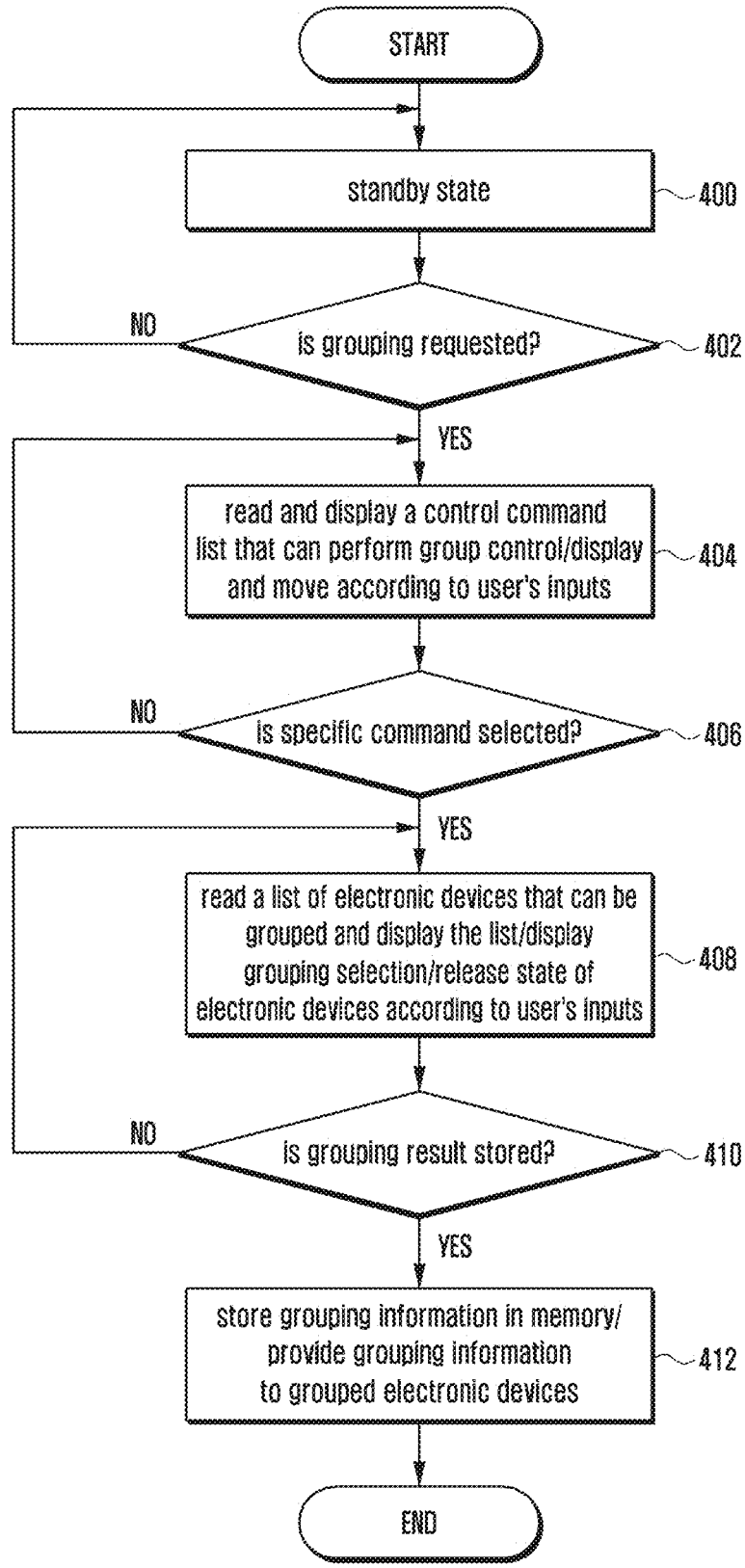
FIG. 4 is a control flow chart that describes a method of setting a group of electronic devices that differ from each other, in a specific electronic device according to the disclosure.

FIG. 4 is a control flow chart that describes a method of setting a group of electronic devices that differ from each other, in a specific electronic device according to the disclosure.

The embodiment shown in FIG. 4 will be described based on the electronic devices 100_A, 100_B, 100_C, 100_D and 100_E shown in FIG. 1. The electronic device of the embodiment shown in FIG. 4 will be described based on the block diagram of the electronic device shown in FIG. 3. It should be understood that the embodiment of FIG. 4 does not consider an operation of stopping a grouping process for a specific command or an operation according to other event, e.g., an incoming call or an operation of inputting other command by a user's request.

The controller 303 maintains a standby state (400). The standby state refers to a state where the electronic device is turned on and determines whether a specific event occurs. When the electronic device is a smart phone 100_A or a smart watch 100_B, the standby state in operation 400 can also include an operation to determine whether an incoming call is received.

The controller 303 can determine whether to receive a grouping request event of electronic devices to which the user applies group control through the user interface 307 (402). The grouping request event can be classified a case where the user inputs a grouping request signal through the input unit 311 of the user interface 310 into a case where a grouping request signal is received through a network. It should be understood that the present disclosure can be possible to use both of the two cases for grouping electronic devices in order to perform group control. In addition, when information input to other electronic devices, such as a server, a computer, and the like, is received from a network, the grouping request signal can also be received along with a specific control command and information about electronic devices for group control. Since the control flow chart of FIG. 4 is an example of a method where the user directly inputs a control command for group control and an input for selecting electronic devices, the case where an input is made through a network is not explained in the following description.

When a grouping request of electronic devices for group control is received in operation 402, the controller 303 reads a list of controllable commands from the memory 305 and displays the list on the display 312 of the user interface 310 (404). After that, the controller 303 can determine whether the user selects a specific command from the input unit 311 (406). When a specific command is input to the input unit 311 in operation 406, the controller 303 proceeds with operation 408. On the contrary, when a specific command is not input to the input unit 311 in operation 406, the controller 303 returns to operation 404.

Figure 5A:
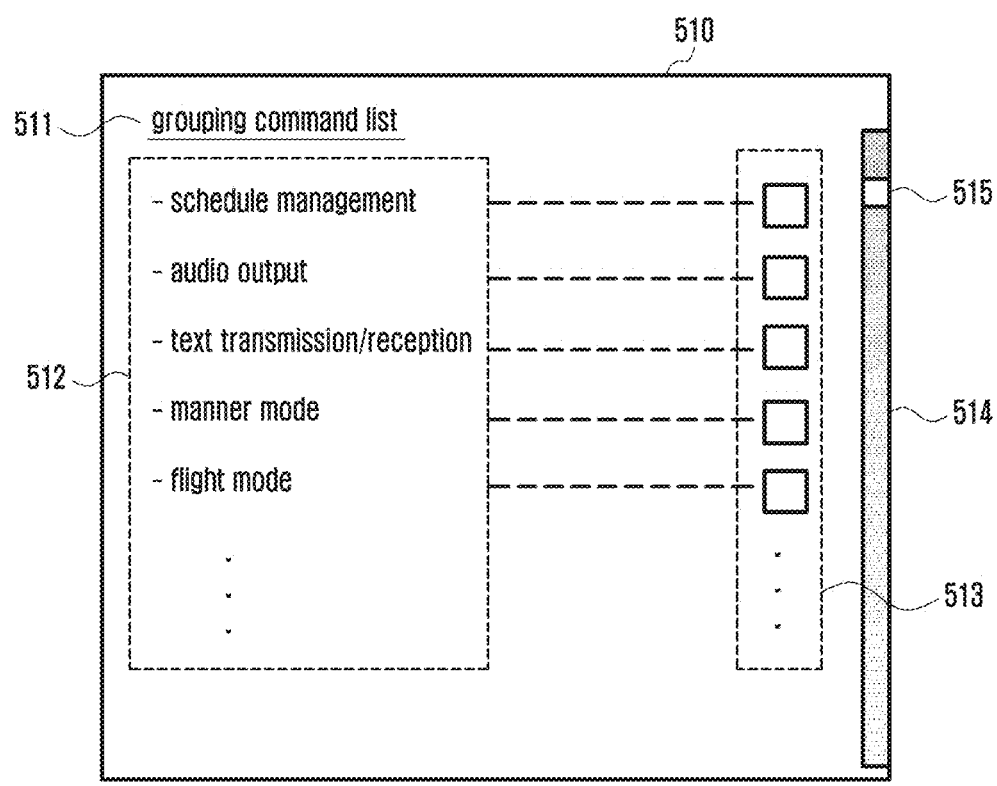
FIG. 5A is a diagram showing the form of a list of group commands according to the present disclosure.

The form of the list of controllable commands that the controller 303 reads from the memory 305 and displays on display 312 is described referring to FIG. 5A.

FIG. 5A is a diagram showing the form of a list of group commands according to the present disclosure. Referring to FIG. 5A, the controller 303 can create a window 510 with a group command list on a part or all of the area of the display 312 in operation 404. The group command list includes commands that are executable on the electronic device and can be applied to a group operation. The commands that are executable on the electronic device and can be applied to a group operation can have been stored in the memory 305 or can be set on a list according to a user's selection. In the following description, for the sake of convenient description, it is assumed that the commands have been stored in the memory 305.

The window 510 with a group command list can display text 511 informing a group command list on the inside area. The text can be displayed at a specific position in the edge of the window 510 with a group command list or at any other position on the display 312 which is not on the window 510 with a group command list. The text can be not displayed on the display 312. It should be understood that FIG. 5A is an example to understand the present disclosure.

Commands 512 are shown below the text 511 of the group command list. The commands can have option areas 513 for selection, respectively. As another example, when the user interface 310 of the electronic device is implemented with a touch screen, the touch screen can be configured without the option areas 513. In that case, when a corresponding command is touched, the touch screen can recognize that a group command has been selected. When the user interface is implemented with a touch screen without the option areas 513, the electronic device can be designed to include a process for detecting a selected command to prevent a user's input error or a user's input position error. It should be understood that the process of detecting a selected command was not illustrated in the control flowchart of FIG. 4.

When not all of the group commands can be displayed on the window 510 since a number of group commands are too large to be displayed on the entire area once, a scroll bar 514 can be created and displayed on the right of the window 510 with the group command list, along with a mark bar 515 indicating a position that the current command is located at.

Referring back to FIG. 4, when a specific command is input to the input unit 311 in operation 406, the controller 303 can read a list of groupable electronic devices, can display the list on the display, and can display a group selection/release state for the electronic devices according to a user's input. The process of displaying a list of groupable electronic devices is described referring to FIG. 5B.

Figure 5B:
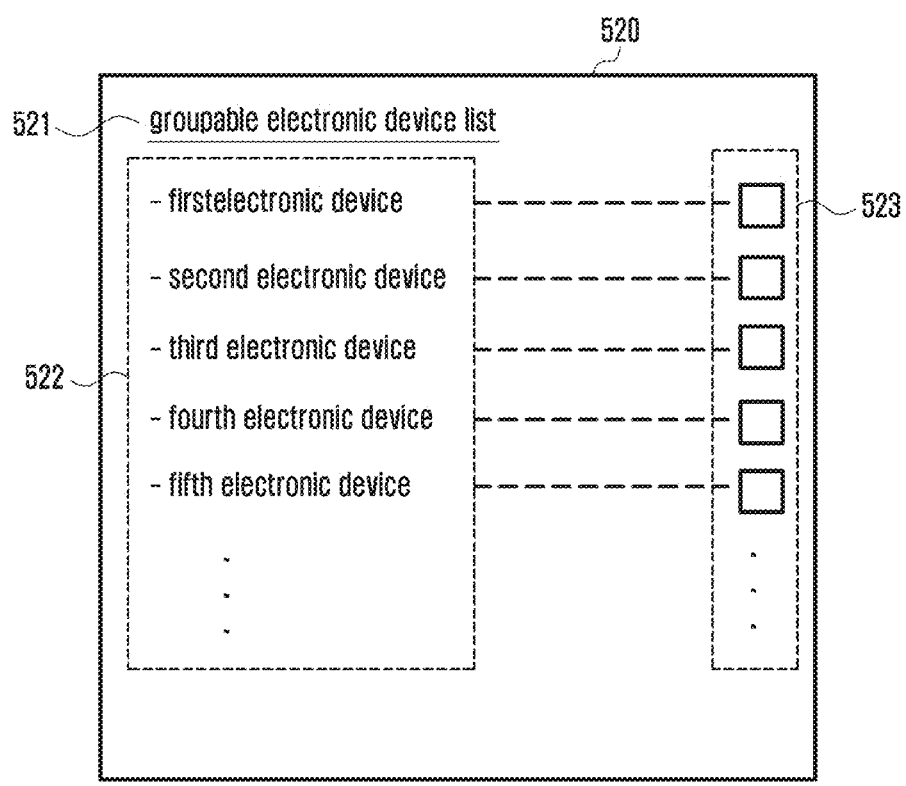
FIG. 5B is a diagram showing a list of groupable electronic devices according to the present disclosure.

FIG. 5B is a diagram showing a list of groupable electronic devices according to the present disclosure. Referring to FIG. 5B, the controller 303 can create a window 520 with a list of groupable electronic devices on a part or all of the area of the display 312 in operation 406. The groupable electronic device list can include other electronic devices that a specific user registered as his/her electronic device, names that the user set to identify the electronic devices, or names that electronic device manufacturers have set. In order to identify the electronic devices, a specific electronic device can employ a method of matching names, e.g., MAC address of electronic device, a preset specific identifier or a user's set identifier. In the present disclosure, it is assumed that the groupable electronic device lists have been stored in the memory 305.

The window 510 with a groupable electronic device list can display text 521 informing a groupable electronic device list on the inside area. The text can be displayed at a specific position in the edge of the window 510 with a groupable electronic device list or at any other position on the display 312, which is not on the window 510 with a groupable electronic device list. The text can be not displayed on the display 312. It should be understood that FIG. 5B is an example to understand the present disclosure.

Electronic devices 522 are shown below the text 521 of the groupable electronic device list. Although the electronic devices 522 are displayed in the form of a 'first electronic device,' 'second electronic device,' third electronic device,' and so on, the electronic devices 522 can also be displayed in the form of a user's set names as described in table 1 or in the form of a manufacturer's set names such as health monitoring device 100_D.

The electronic devices 522 can have option areas 523 for selection, respectively. As another example, when the user interface 310 of the electronic device is implemented with a touch screen, the touch screen can be configured without the option areas 523. In that case, when a corresponding electronic device name is touched, the touch screen can recognize that the touched electronic device has been selected to be included in the group list. The display can be configured to alter the display form of an electronic device name selected to display the selected electronic device. In addition, when the user interface is implemented with a touch screen without the option areas 523, the electronic device can be designed to include a process for detecting a selected electronic device to prevent a user's input error or a user's input position error. It should be understood that the process of detecting a selected command was not illustrated in the control flowchart of FIG. 4.

Although it is not illustrated in FIG. 5B, when not all of the electronic devices on the list can be displayed on the window 510 since a number of electronic devices are too large to be displayed on the entire area once, it will be appreciated to the person skilled in the art that a scroll bar can be created and displayed on the window as shown in FIG. 5A.

Referring back to FIG. 4, when one or more electronic devices are selected as electronic devices to be grouped in operation 408, the controller 303 can determine whether a request is made to store the selected electronic devices through the input unit 311 (410). When the controller 303 ascertains that a request has been made to store the selected electronic devices in operation 410, it proceeds with operation 412 and stores information about the grouped electronic devices in the memory. The controller 303 can also provide the information about the grouped electronic devices to the other electronic devices.

The case where electronic devices are grouped by a specific command according to the flowchart shown in FIG. 4 is described based on the electronic devices 100_A, 100_B, 100_C, 100_D and 100_E shown in FIG. 1.

The following case is not described: a case where a single electronic device forms one group, that is, only a specific electronic device runs. For example, an explanation is not made about the following case: a case where an input command is executed in only one electronic device, e.g., a case where an outgoing voice call is made on a smart phone 100_A or a case where a specific game is executed.

When one user uses the electronic devices 100_A, 100_B, 100_C, 100_D and 100_E shown in FIG. 1, each of the electronic devices 100_A, 100_B, 100_C, 100_D and 100_E can store information about the other electronic devices that the electronic device can communicated with. The respective electronic devices can the information as shown in FIG. 5B. The number of electronic devices that have been registered as an electronic device with a communication function can vary according to the features of the electronic devices. For example, a medical device such as a health monitoring device 100_D can register a smart phone 100_A and a tablet computer 100_E as an electronic device with a communication function. As another example, each of the smart phone 100_A and tablet computer 100_E can store information about all of the other electronic devices except for itself. Therefore, the following description provides a process of setting a group that needs to perform the same command in two or more electronic devices, assuming that a smart phone 100_A runs.

According to an embodiment, in the case of a silent mode or a vibrate mode, a second electronic device 100_B, a third electronic device 100_C and a fifth electronic device 100_E can be set as electronic devices that need to simultaneously or sequentially alter the setting along with a first electronic device 100_A. In that case, for a command of a silent mode or a vibrate mode, the first electronic device 100_A, second electronic device 100_B, third electronic device 100_C and fifth electronic device 100_E can be set to perform the same command. The command of a silent mode or a vibrate mode corresponds to a control command as described above referring to FIG. 5A. Therefore, when a control command for a silent mode or a vibrate mode is selected, electronic devices can be displayed as selectable electronic devices as shown in FIG. 5B. When a user selects the second electronic device 100_B, third electronic device 100_C and fifth electronic device 100_E from the selectable electronic devices and then makes a request for storage, a group for one command is formed and stored. Therefore, the controller 303 of the first electronic device 100_A can register the second electronic device 100_B, third electronic device 100_C and fifth electronic device 100_E as electronic devices that need to run along with the first electronic device 100_A according to the command for a silent mode or a vibrate mode.

As described above, for a silent mode or vibrate mode, a user can set the electronic devices 100_A, 100_B, 100_C, and 100_E that can make an alarm for usual states except for an emergency situation so that they can operate in the same way for the silent mode or vibrate mode. As such, the grouped electronic devices can simultaneously or sequentially set or release a silent mode or vibrate mode.

As another example, there can be a need to set an airplane mode. In that case, a user can set all of the electronic devices 100_A, 100_B, 100_C, 100_D and 100_E that the electronic devices cooperate with the other electronic devices in the same way as described above.

Meanwhile, medical equipment such as electronic device with a specific function, e.g., a health monitoring device 100_D, can be an exception when applying the setting methods described above. For example, for medical equipment for monitoring heart rhythm worn on a patient with heart diseases or medical equipment for measuring a level of blood sugar worn on a diabetic, there can be a need to inform the wearer's emergency situation. In that case, although the electronic device is set in a silent mode or vibrate mode in public places or in an airplane mode, when the user wearing medical equipment is in an emergency situation, the user's emergency situation needs to be informed by a variety of alarming ways.

FIG. 6 is a signal flow chart that describes a method of cooperating with electronic devices when a control command is input to a first electronic device that needs to cooperate with the other electronic devices, according to the present disclosure.

The embodiment of FIG. 6 is described, assuming that the first electronic device 100_A, second electronic device 100_B and third electronic device 100_C are a smart phone, smart watch and smart glasses, respectively. It is also assumed that the first electronic device 100_A, second electronic device 100_B and third electronic device 100_C are grouped as one according to an input control command.

When the first electronic device 100_A receives a control command (600), it analyzes the control command (602). The analysis of the control command can include a determination as to whether the corresponding command is a group control command for group control. Before the determination, the electronic device can determine whether it is a master. Since the embodiment is described assuming that the user inputs the control command, it should be understood that the electronic device does not determine whether it is a master.

The following description provides a process of determining control commands for group control in operation 602, based on the examples described above. For example, when the first electronic device 100_A receives a control command for setting an airplane mode in operation 600, it analyzes whether the received control command is a command to be executed along with other electronic device set as a group in operation 602. After that, the first electronic device 100_A executes the received control command (604). When the first electronic device 100_A ascertains that the received control command is a command to be executed along with other electronic device set as a group in operation 602, it performs operations 610 and 612. That is, the first electronic device 100_A transmits the control command to the second electronic device 100_B and the third electronic device 100_C as other electronic device set as a group.

The second electronic device 100_B receives the control command from the first electronic device 100_A (610) and performs an operation corresponding to the received control command (620). The third electronic device 100_C receives the control command from the first electronic device 100_A (612) and performs an operation corresponding to the received control command (622). Therefore, although the user inputs a control command, grouping the electronic device and the other electronic devices for group control, to one electronic device, the electronic device can cooperate with the other electronic devices.

Although the embodiment of FIG. 6 is implemented in such a way that the first electronic device 100_A, second electronic device 100_B and third electronic device 100_C sequentially perform the control command, it should be understood that the first electronic device 100_A can first perform operations 610 and 612 and then operation 604 after operation 602. In addition, although the embodiment of FIG. 6 is implemented in such a way that the first electronic device 100_A transmits a control command to the second electronic device 100_B and then to the third electronic device 100_C, it should be understood that the transmission order of the control command can be altered or the control command can be simultaneously to both of the electronic devices once.

Meanwhile, although the embodiment of FIG. 6 is implemented in such a way that the second electronic device 100_B and the third electronic device 100_C do not transmit response signals, ACK/NACK, to the first electronic device 100_A, it will be appreciated that the embodiment can also be implemented in such a way that the response signal ACK/NACK is transmitted between the electronic devices, thereby increasing the reliability of operations. In addition, when the first electronic device 100_A receives a non-acknowledgement signal NACK, it can perform re-transmission of the control command.

Figure 7:
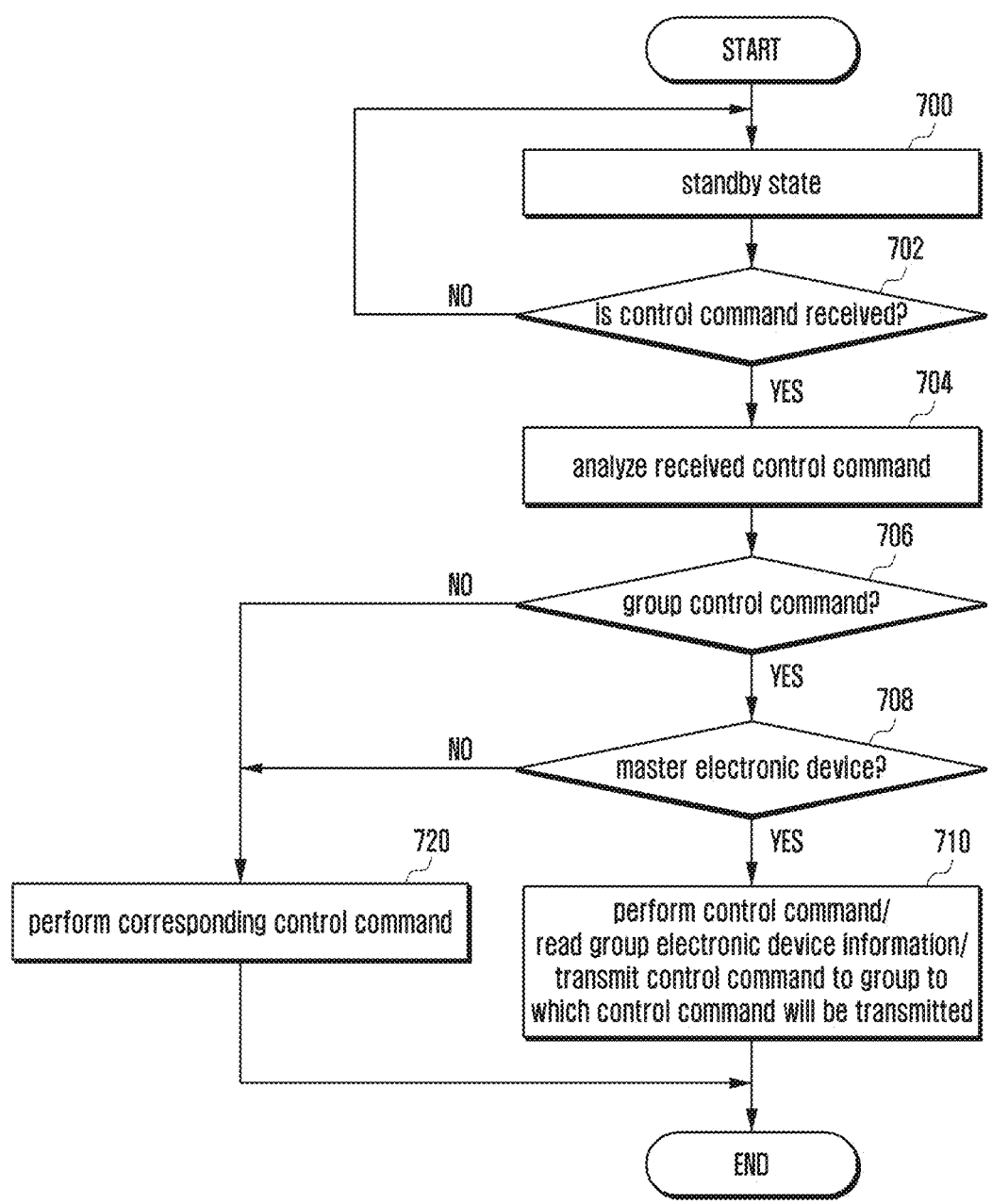
FIG. 7 is a control flow chart that describes a method of performing group control in an electronic device when the electronic device receives a control command according to the present disclosure.

FIG. 7 is a control flow chart that describes a method of performing group control in an electronic device when the electronic device receives a control command according to the present disclosure.

The embodiment of FIG. 7 is described based on the electronic device shown in FIG. 3. The grouping of electronic devices required for group control is described based on the electronic devices 100_A, 100_B, 100_C, 100_D and 100_E shown in FIG. 1.

The controller 303 maintains a standby state (700). The standby state can be the same state as described above referring to FIG. 4. That is, the standby state refers to a state where the electronic device is turned on and determines whether a specific event occurs. When the electronic device is a smart phone 100_A or a smart watch 100_B, the standby state in operation 700 can also include an operation to determine whether an incoming call is received.

While maintain the standby state, the controller 303 determines whether to receive a specific control command (702). The control command can be a control command that the user inputs to the input unit 311 or a control command transmitted from an external network. The control command from an external network can be: a control command that is transmitted from a server through a network, a control command that is transmitted from other electronic device through an inter-device network 50, or a control command that is transmitted from a mobile communication network. Since FIG. 7 is a control flowchart to describe the operations of the first electronic device described in FIG. 6, the control flowchart does not consider a control command that has received from the other electronic devices through the inter-device network 50. The flowchart of FIG. 7 is described based on a case where the user inputs a control command registered as a group control command to the input unit 311.

When the controller 303 ascertains that a specific control command is received in operation 702, it analyzes the received control command (704). The analysis of the control command can be a process of determining whether the received control command is a group control command stored in the memory 305 as described in table 1. That is, the controller 303 can read group control commands from the memory 305 and can determine whether the received control command is one of the group control commands stored in the memory 305 in operation 706.

After that, when the controller 303 ascertains that the received control command is a group control command stored in operation 706, it proceeds with operation 708. On the contrary, when the controller 303 ascertains that the received control command is not a group control command stored in operation 706, it proceeds with operation 720 and can perform a corresponding control command.

When the controller 303 proceeds with operation 708, it can determine whether the current electronic device is a master electronic device. When the controller 303 ascertains that the current electronic device is a master electronic device in operation 708, it proceeds with operation 710. On the contrary, when the controller 303 ascertains that the current electronic device is not a master electronic device in operation 708, it proceeds with operation 720.

Operation 708 serves to perform operation 710 for a case where an electronic device to which the user has input a command is not a master electronic device. In addition, with respect to the standard to determine whether an electronic device is a master electronic device, since an electronic device carried by a user can be a master electronic device as described above, an electronic device that directly receives a user's input can be a master electronic device. On the contrary, when an electronic device receives a control command transmitted from a server through a network or from the other electronic devices, it is important to determine whether the electronic device is a master electronic device.

For example, although a control command transmitted from a server through a network is a command for group control, when the electronic device is not a master electronic device based on the determination result of operation 708, the received control command is performed in only a corresponding electronic device in operation 720. On the contrary, when the electronic device is a master electronic device based on the determination result of operation 708, the controller 303 proceeds with operation 710.

When the controller 303 proceeds with operation 710, it executes the received group control command in a corresponding electronic device. Simultaneously, the controller 303 reads information about electronic devices that need to perform a corresponding command from the memory 305 and transmits a control command to the other electronic devices that have been grouped for group control. The information about electronic devices can be unique addresses allocated to respective electronic devices, e.g., MAC address.

The operations described above are performed for group control with respect to a case where a group has been set. However, the embodiment can be implemented in such a way that, when a specific control operation is performed, the user can set a control group for each corresponding control command.

For example, when a specific electronic device can adjust the level of brightness, with completing the adjustment of brightness, it can simultaneously make a setup so that the other electronic devices are adjusted in the same level of brightness. When electronic devices have not been grouped, group control is described as follows referring to the accompanying drawings.

Figure 8:
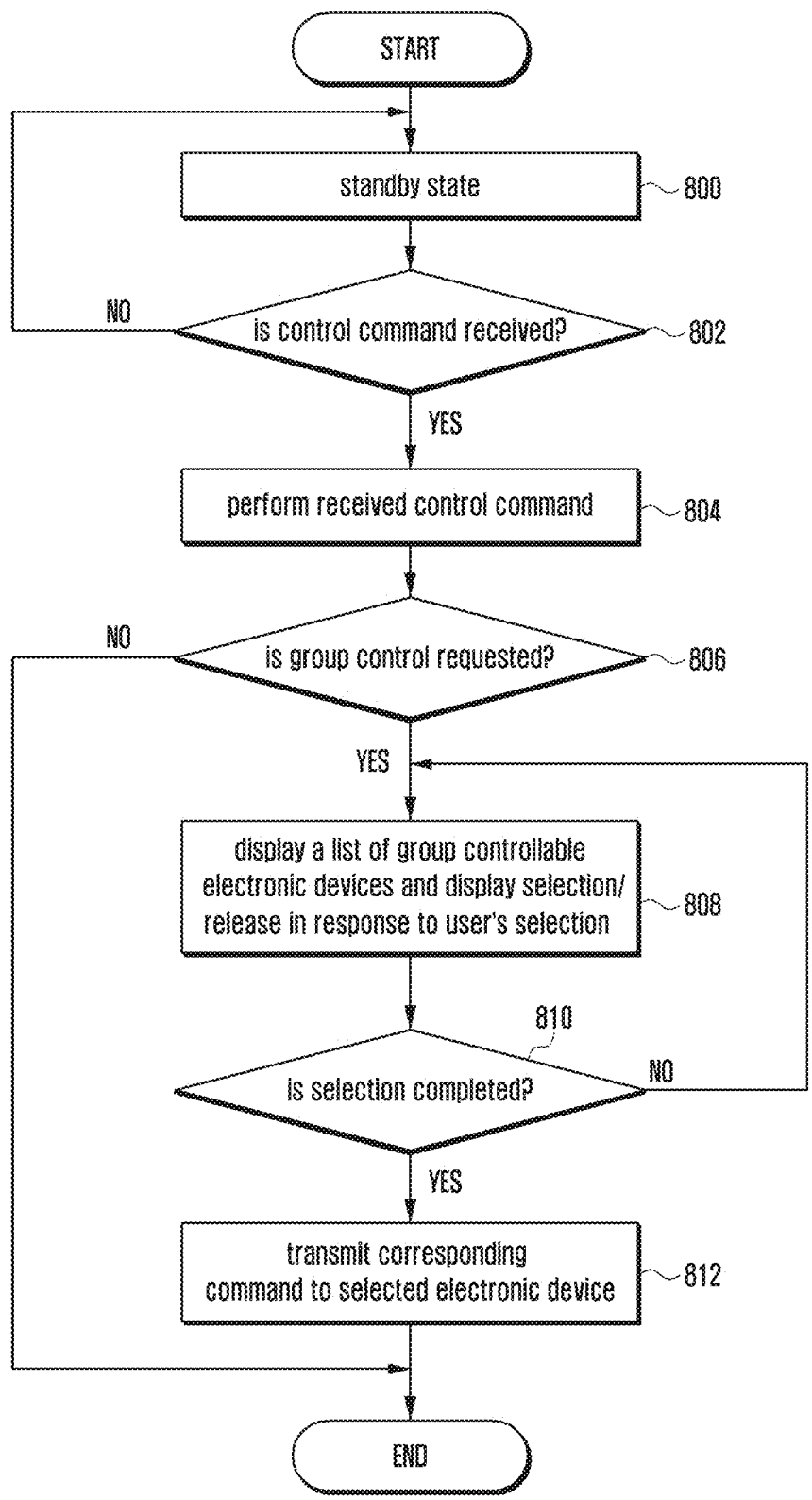
FIG. 8 is a control flow chart that describes a method of performing group control by commands that have not been grouped, according to another embodiment of the present disclosure.

FIG. 8 is a control flow chart that describes a method of performing group control by commands that have not been grouped, according to another embodiment of the present disclosure.

The embodiment of FIG. 8 is described based on the electronic device shown in FIG. 3. The grouping of electronic devices required for group control is described based on the electronic devices 100_A, 100_B, 100_C, 100_D and 100_E shown in FIG. 1.

The controller 303 maintains a standby state (800). The standby state can be the same state as described above referring to FIG. 4 and FIG. 7. That is, the standby state refers to a state where the electronic device is turned on and determines whether a specific event occurs. When the electronic device is a smart phone 100_A or a smart watch 100_B, the standby state in operation 800 can also include an operation to determine whether an incoming call is received.

While maintaining the standby state, the controller 303 determines whether to receive a specific control command (802). The control command can be a control command that the user inputs to the input unit 311 or a control command transmitted from an external network. The control command from an external network can be: a control command that is transmitted from a server, a control command that is transmitted from other electronic device through an inter-device network 50, or a control command that is transmitted from a mobile communication network. Like the embodiment described above referring to FIG. 7, the embodiment of FIG. 8 does not consider a control command that has received from the other electronic devices through the inter-device network 50. The flowchart of FIG. 8 is described based on a case where the user inputs a control command registered as a group control command to the input unit 311.

When the controller 303 receives a control command in operation 802, it executes the received control command (804). That is, the controller 303 performs an operation corresponding to a user's requested command. For example, when a user adjusts a level of brightness of the display 312 of the smart phone 100_A as a first electronic device 100_A, the controller 303 of the first electronic device 100_A adjusts the level of brightness.

After that, the controller 303 determines whether a group control request is input to the input unit 311 (806). When the controller 303 ascertains that a group control request is input to the input unit 311 in operation 806, it can display a list of group-controllable electronic devices and also a selection/release state for selecting the group-controllable electronic devices or for releasing the selection according to a user's input signal input to the input unit 311 (808). The list of group-controllable electronic devices can be the similar or same form as the example shown in FIG. 5B.

However, when the controller 303 ascertains that a group control request is not input to the input unit 311 in operation 806, it can terminate the routine of FIG. 8. That is, the operation can be a general process of controlling only the specific single electronic device.

Meanwhile, after selecting the group-controllable electronic devices or releasing the selection in operation 808, the controller 303 determines whether a selection completion of group-controllable electronic devices is input to the input unit 311 (810). When the controller 303 ascertains that a selection completion of group-controllable electronic devices is input to the input unit 311 in operation 810, it proceeds with operation 812. On the contrary, when the controller 303 ascertains that a selection completion of group-controllable electronic devices is not input to the input unit 311 in operation 810, it returns to operation 808.

The controller 303 can transmit information corresponding to the input command to the selected electronic devices so that the corresponding electronic devices sequentially perform the same operation in operation 812. The information about electronic devices to transmit control commands can be unique addresses allocated to the respective electronic devices.

As described above, the method of setting a control group is implemented in such a way that a control group can be previously set by a user or when a specific control process is performed or can be dynamically set according to a specific preset rule. The following description provides specific preset rules.

Remote communication devices can be set as a first group based on a preset rule. For example, the smart phone, the smart watch, etc., shown in FIG. 1, can be a first group of remote communication devices. In addition, remote communication devices with a call receiving function can be set as a second group. As shown in FIG. 1, the first group of devices and the second group of devices can be configured as the same type of devices. In addition, devices with a display can be set as a third group. As shown in FIG. 1, the smart phone, the tablet computer, the smart watch, etc., can be set as a third group. In addition, health sensors can be set as a fourth group. Communication devices can be set as groups based on preset rules.

In addition, a specific electronic device can be set as a master by using preset rules described above or according to a user's set groups. When a specific electronic device is set as a master, an electronic device that the user has selected can be a master electronic device or a mater electronic device can be selected according to a specific condition.

As one of the conditions of qualifying as a master, an electronic device the minimum requirements of which is higher can have the priority to be selected as a master. When electronic devices have the same or minimum requirements, the priority for qualifying as a master can be the screen size, a state or condition whether the user carries the electronic device.

According to the current states of the electronic devices, a master electronic device can be dynamically set. For example, electronic devices that users usually wear, such as The Samsung Galaxy Gear, can easily detect whether to be worn by users based on the presence of an electrical signal detected from the skin. However, other types of electronic devices such as mobile phones, tablet computers, etc. have difficulty in detecting whether uses carry them. In that case, an electronic device that has correctly detected that it is carried by the user can be a master electronic device.

An electronic device set as a master electronic device can serve as a master for the control flowchart of FIG. 4 and can also be selected as first electronic device for the signal flow chart of FIG. 6.

According to the characteristics of electronic devices, the priority order for a master can be determined. For example, although the tablet computer can have a higher priority than the smart phone in terms of the minimum requirements, the priority order between them can be previously set according to their characteristics so that the smart phone has a higher priority than the tablet computer, considering the portability, etc. In addition, although the smart watch can have a higher priority than the smart phone in terms of the portability, the priority order between them can be previously set according to their characteristics so that the smart phone has a higher priority than the smart watch.

Meanwhile, although the embodiments are implemented in such a way that group control is performed through a user's inputs to the electronic device, it should be understood that the group control can also be performed by a server. For example, when a user carries electronic devices to places to be quiet, such as a theater, etc., the electronic devices can be set to a silent mode or vibrate mode by a server of the theater through a wireless network. In that case, the electronic device can be controlled by the same operations as described above, except that the electronic device receives a control signal not from the user but from the server through the network.

As described above, the method and apparatus according to the present disclosure can easily control a variety of electronic devices carried by a user or worn on a user's body by controlling a single electronic device. In addition, the method and apparatus according to the present disclosure can transmit, when a specific command is input to one electronic device, input commands to the other electronic devices that need to perform corresponding commands, and can simultaneously or sequentially control the other electronic devices.

As described above, a part of the method (e.g., operations) or system (e.g., modules or functions) according to the present disclosure can be implemented with command instructions that can be conducted via various types of computers and stored in computer-readable storage media, as types of programming modules, for example. One or more processors (e.g., processor 210) can execute commend instructions, thereby performing the functions. An example of the computer-readable storage media can be memory 230. At least a part of the programming modules can be implemented (executed) by processor 210, for example. At least a part of the programing module includes modules, programs, routines, sets of instructions or processes, etc., for example, in order to perform one or more functions.

Examples of non-transitory computer-readable media include: magnetic media, such as hard disks, floppy disks, and magnetic tape, optical media such as CD-ROM disks and DVDs; magneto-optical media, such as floptical disks, and hardware devices that are specially configured to store and perform program instructions (programming modules), such as read-only memory (ROM), random access memory (RAM), flash memory, and the like. Examples of program instructions include machine code, such as produced by a compiler, and files containing higher level code that can be executed by the computer using an interpreter. The described hardware devices can be configured to act as one or more software modules in order to perform the operations and methods described above, or vice versa.

Modules or programming modules according to the present disclosure may include one or more components, remove a part of them described above, or include new components. The operations performed by modules, programming modules, or the other components, according to the present disclosure, may be executed in serial, parallel, repetitive or heuristic fashion. A part of the operations can be executed in any other order, skipped, or executed with additional operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A first electronic device, comprising:
    a communication interface configured to communicate with a second electronic device or a server;
    a memory configured to store a grouping table including one or more group control commands and one or more second electronic devices, wherein a group control command corresponds to at least one second electronic device;
    an input interface configured to receive an input from a user;
    a display configured to display an operation state of the first electronic device; and
    a controller configured to:
        receive a control command from the input interface, wherein the control command is one of a silent mode transition command, a vibration mode transition command, airplane mode transition command, or a display brightness adjustment command,
        identify whether the received control command corresponds to a group control command in the grouping table and the first electronic device is a master electronic device,
        transmit, in case that the received control command corresponds to the group control command in the grouping table and the first electronic device is the master electronic device, the received control command to at least one second electronic device mapped to the group control command, and
        execute the received control command.

2. The first electronic device of claim 1, wherein the controller is further configured to:
    receive a grouping request signal from the user through the input interface;
    display a group control command list, the at least one second electronic device, and the mapped second electronic device on the display of the first electronic device;
    receive a first selection signal of a first control command among a group control command list from the user through the input interface;
    receive a second select signal indicating the at least one second electronic device among the electronic devices from the user through the input interface;
    map the first control command and the at least one second electronic device; and
    store results of the mapping.

3. The first electronic device of claim 2, wherein the grouping table further comprises one of a name of the at least one second electronic device or a description of the at least one second electronic device.

4. The first electronic device of claim 1, wherein the controller is further configured to execute a received group control command based on the first electronic device being a slave electronic device.

5. A method for executing a control command in a first electronic device, the method comprising:
    storing a grouping table in a memory, wherein the grouping table includes one or more group control commands and one or more second electronic devices and, wherein a group control command corresponds to at least one second electronic device;
    receiving a control command from an input interface of the first electronic device, wherein the control command is one of a silent mode transition command, a vibration mode transition command, airplane mode transition command, or a display brightness adjustment command;
    identifying whether the received control command corresponds to a group control command in the grouping table and the first electronic device is a master electronic device;
    transmitting, in case that the received control command corresponds to the group control command in the grouping table and the first electronic device is the master electronic device, the received control command to at least one second electronic device mapped to the group control command; and
    executing the received group control command.

6. The method of claim 5, further comprising:
    generating the grouping table,
    wherein generating the grouping table comprises:
    receiving a grouping request signal from a user through the input interface,
    displaying a group control command list, the at least one second electronic device, and the mapped second electronic device,
    receiving a first selection signal of a first control command among a group control command list from the user through the input interface,
    receiving a second selection signal indicating the at least one second electronic device among the electronic devices from the user through the input interface;
    mapping the first control command and the at least one second electronic device; and
    storing results of the mapping.

7. The method of claim 6, wherein the grouping table further comprises one of a name of the at least one second electronic device or a description of the at least one second electronic device.

8. The method of claim 5, further comprising executing a received second control command based on the first electronic device being a slave electronic device.

* * * * *